United States Patent [19]

Wells

[11] 4,224,923
[45] Sep. 30, 1980

[54] SOLAR ROOF DRAIN

[76] Inventor: Carl E. Wells, 213 Palmer Dr., Fayetteville, N.Y.

[21] Appl. No.: 933,492

[22] Filed: Aug. 14, 1978

[51] Int. Cl.³ .............................................. F24J 3/02
[52] U.S. Cl. ................................... 126/417; 126/449; 126/450; 165/47
[58] Field of Search ................ 52/12, 16, 94; 165/47, 165/48 S; 126/270, 271, 446, 417, 450, 439; 47/17; 237/80

[56] References Cited

U.S. PATENT DOCUMENTS

| | | | |
|---|---|---|---|
| 2,111,251 | 3/1938 | Spilsbury | 52/94 |
| 2,553,302 | 5/1951 | Cornwall | 126/271 X |
| 2,625,930 | 1/1953 | Harris | 126/270 |
| 2,699,484 | 1/1955 | Michaels | 52/94 X |
| 3,207,211 | 9/1965 | Winterfeldt | 126/270 |
| 3,366,168 | 1/1968 | Dale | 126/417 |
| 3,388,738 | 6/1968 | Dery | 165/47 |
| 4,069,812 | 1/1978 | O'Neill | 126/270 X |

Primary Examiner—James C. Yeung
Assistant Examiner—Larry Jones
Attorney, Agent, or Firm—Richard L. Miller

[57] ABSTRACT

A device for being placed upon a house inclined roof for promoting the melting and draining of snow from a roof during a wintertime; the device consisting of a solar heat collecting box that includes a corrugated sheet metal bottom which heat up either by direct sunlight rays or by an electric heating coil, so that water under the device will continue to run instead of freezing, the device also including an adjustable reflector panel inside the box so to reflect indirect sunlight rays toward the corrugated, heat-collecting bottom, and the top of the box being closed by an upwardly rounded, transparent cover so to retain heat therewithin, the box in use extending over the roof eaves.

2 Claims, 4 Drawing Figures

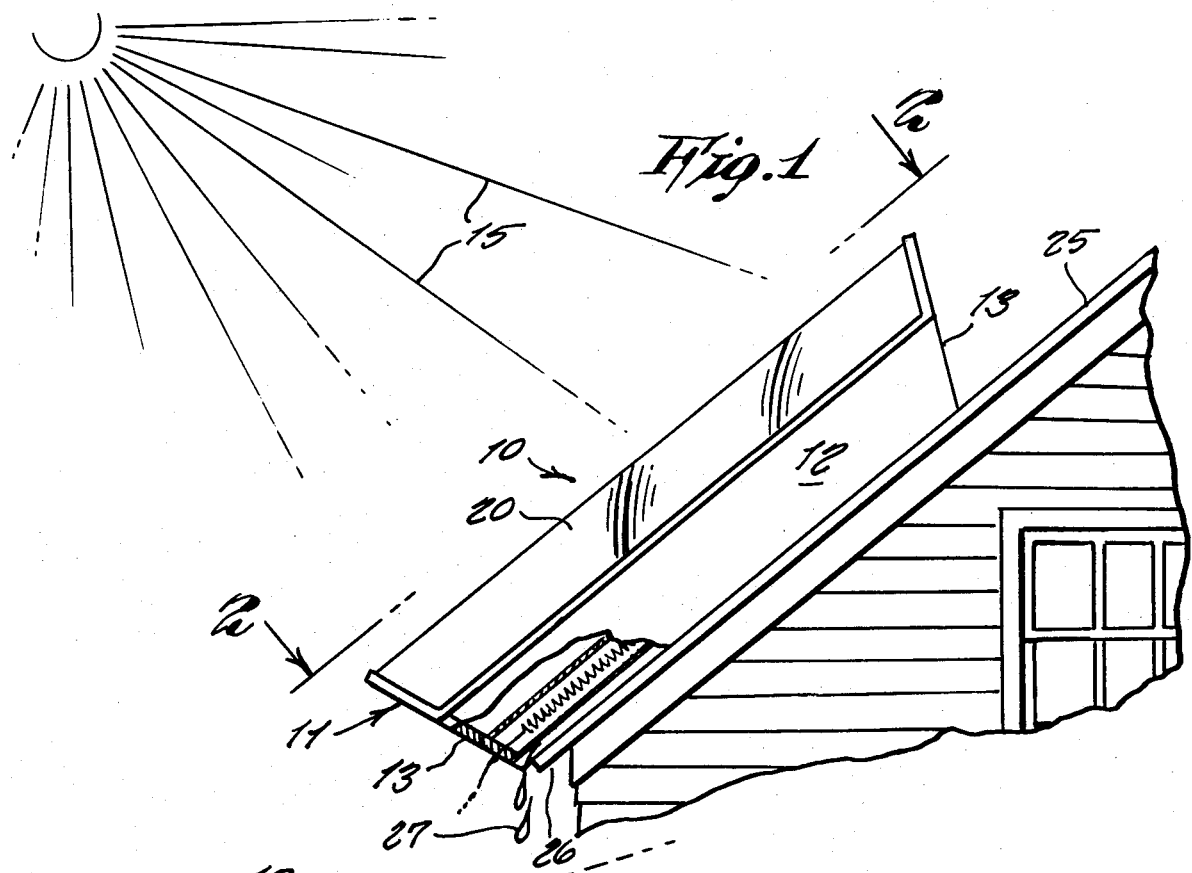
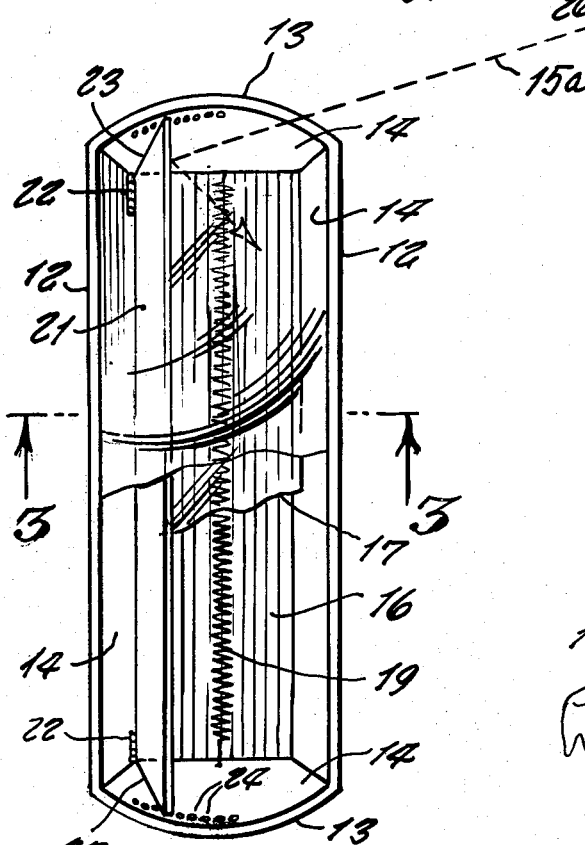
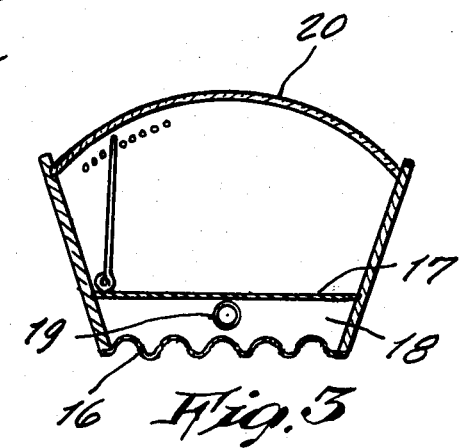
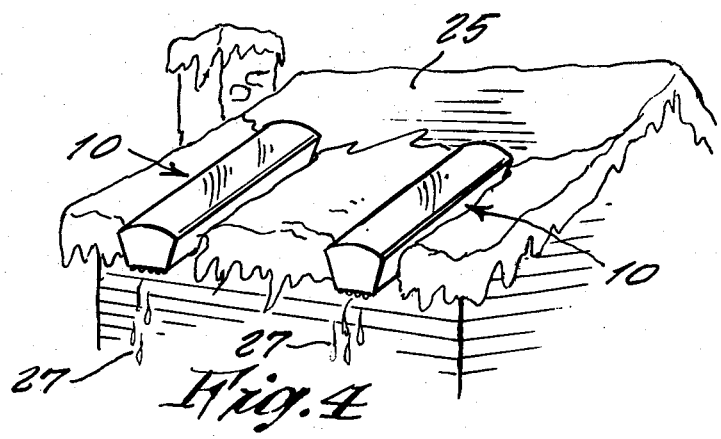
Fig. 1  
Fig. 2  
Fig. 3  
Fig. 4

SOLAR ROOF DRAIN

This invention relates generally to solar heat collectors.

It is generally well known that snow and ice build-up upon the eaves of a house roof will in time cause water therefrom to seep around edges and through the roof, causing rotting of the construction and doing possible water damage inside the house. This situation is objectionable and is therefore in want of an improvement.

Accordingly it is a principal object of the present invention to provide a device that will cause the snow and ice on top of a roof in the vicinity of an eaves to melt and keep the water, thus melted, running off the rood, instead allowing it to re-freeze, and the device forming a drain underneath which the water runs.

Another object is to provide a device which uses either the heat from a sun's rays or heat from an electric coil for its intended purposes.

Still another object is to profice a solar roof device which additionally can be used to keep water passages open which otherwise become blocked with ice.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

FIG. 1 is a side view of the solar roof drain installed upon a roof.

FIG. 2 is a view of the device taken on line 2—2 of FIG. 1.

FIG. 3 is a cross sectional view taken on line 3—3 of FIG. 2.

FIG. 4 is a perspective view of a plurality of the solar roof drains on a snow-covered roof and showing the devices in operative use.

Refering now to the drawing in greater detail, the reference numeral 10 represents a solar roof drain according to the present intention wherein there is a box 11 made either of lumber, sheet metal, fiberglass or other suitable material and which includes upwardly diverging opposite side walls 12 and end walls 13, the inner sides of which are covered with a reflective material 14, so that sunlight rays 15 striking thereupon will reflect toward a bottom wall 16 of the box and which is made of black painted, corrugated, sheet metal such as is used in shed roof constructions, so that the bottom wall serves as a heat collector; the corrugations extending longitudinally in the box.

Spaced above the heat collector is a flat heat retainer 17 made either of transparent glass, plastic or fiberglass so to allow the sunlight rays to pass therethrough to the heat collector. A sealed chamber 18 is thus formed between the heat collector and heat retainer in order that the temperature adjacent the heat collector is maintained as warm as possible.

An electric heating coil 19 is contained within the chamber 18 and serves to provide the heat in the chamber in case of insufficient solar heat such as on cloudy days. The coil is connected by electric wires to a convenient, manually operated switch of a circuit connected to a household electric power.

A top of the box is closed by an upwardly rounded, transparent cover 20 that is made of a similar material such as the heat retainer so that sunlight rays can likewise pass therethrough.

An adjustable reflector 21 is contained within the box so to reflect indirect sunlight rays 15a toward the box bottom wall. The reflector pivots about hinges 22 and is maintained in selected, fixed position by a detent along opposite end edges 23 of the reflector selectively being engaged in openings 24 formed on the box end walls 13.

In operative use, as shown, the device is installed on a lower portion of an inclined roof 25 extending longitudinally over the roof eaves 26 where heaviest snow and ice accumulation occurs. The height of the device is about 10 or 12 inches so to extend higher than the accumulation. The heat in the device causes water from the melting snow and ice to run underneath the device and off the roof eaves as shown at 27, without re-freezing on the way.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A solar roof drain, comprising in combination, an elongated box having upwardly diverging opposite side and end walls, and a bottom wall of blackened corrugated sheet metal serving as a heat collector said bottom wall being aligned with the lower edges of said side and end walls so that said bottom wall contacts a roof surface upon which said box is placed, wherein a heat retainer is spaced above said heat collector and is comprised of a transparent sheet material, a top edge of said box is closed by a transparent rounded cover, an electric heating coil is contained within a space between said heat collector and said heat retainer, and means for connecting said heating coil to a household electric power source, an adjustable reflector inside said box pivoted on hinges and secured in selected angular position by detents on opposite end edges thereof engaging selected openings in said box end walls.

2. The combination as set forth in claim 1, wherein the corrugations of said bottom wall extend in a longitudinal direction along the length of said box.

* * * * *